Nov. 13, 1945.   F. V. JOHNSON   2,388,977
SYSTEM FOR THE TRANSMISSION OF ANGULAR MOTIONS
Filed Jan. 3, 1938
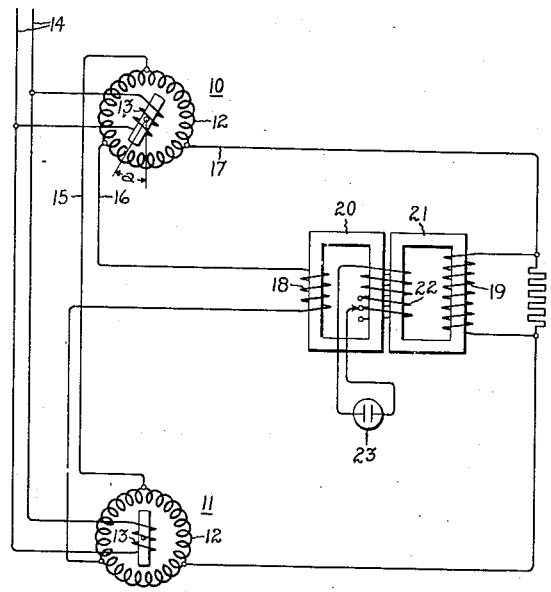
Inventor:
Frithiof V. Johnson,
by Harry E. Dunham
His Attorney.

Patented Nov. 13, 1945

2,388,977

UNITED STATES PATENT OFFICE 2,388,977

SYSTEM FOR THE TRANSMISSION OF ANGULAR MOTION

Frithiof V. Johnson, Schenectady, N. Y., assignor to General Electric Company, a corporation of New York Application January 3, 1938, Serial No. 183,043

4 Claims. (Cl. 177—337)

My invention relates to systems for the transmission of angular motion and has for its object the provision of means for indicating abnormal conditions in such a system.

United States Letters Patent 1,576,189, March 9, 1926, describes an angular motion transmission system having apparatus for indicating abnormal conditions in such system. Such apparatus, however, involves moving parts which are undesirable if they can be avoided. The subject matter of the present invention pertains to improved apparatus having no moving parts for indicating abnormal conditions in motion transmission systems.

The motion transmission system to which my invention is applicable usually consists of a transmitter and one or more receivers having structures generally similar to three phase synchronous dynamo electric machines. The respective phases of the transmitter and receiver are interconnected by three wires analagous to a three phase connection and the field magnets are excited in parallel from a single phase source. When transmitter and receiver are similar and the rotating elements of transmitter and receiver have the same angular position with respect to their interconnected three phase windings, no current flows in the three wire system, but if the rotor of the transmitter is turned, currents are induced in the three wire system which tend to turn the rotor of the receiver into a corresponding position after which the current in the three phase system will again be reduced to zero. Normally, only sufficient current flows in the three phase system to turn the receiver when the transmitter is turned. If, however, something should interfere with this intended operation, as for example, a blocking of the receiver rotor, the system would no longer function properly and the currents in the three phase system would increase in proportion to the discrepancy in the rotary positions of transmitter and receiver. Should this happen it is desirable that the condition be detected and corrected. The indicator of my invention is for accomplishing this result.

While the aggregate circulating current which flows in the three phase system is proportional to the angular discrepancy between transmitter and receiver, the current which flows in any given phase of such system varies with the angular position of the field producing means with respect to such phase, and hence, one may not simply connect a current indicating device in one phase and obtain the indication desired. Moreover, one may not simply add the currents in the three phases to obtain the indication desired because the sum of the currents in the three phases is always zero.

I have discovered, however, that if the currents or voltages proportional to the currents in any two phases of the three phase system be added in a certain phase relation to each other as by means of a transformer, the secondary voltage of the transformer obtained from such addition is proportional to the aggregate current flow in the system and hence proportional to the angular discrepancy between transmitter and receiver and is independent of the ratio of the currents flowing in the different phases, and hence is independent of the average phase angular position of the transmitter and receiver.

The features of my invention which are believed to be novel and patentable will be pointed out in the claims appended hereto. For a better understanding of my invention, reference is made in the following description to the accompanying drawing which illustrates a preferred embodiment of my invention.

In the drawing I have represented a motion transmitting system comprising a transmitter 10 and a receiver 11. The transmitter and receiver are assumed to be similar and each has a stator winding 12 and a rotor winding 13. In this case the rotor windings are energized in parallel from a single phase source 14 and the stator windings are connected together at three points in the manner of three phase machines by the transmission circuit consisting of wires 15, 16 and 17.

My indicating device in its simplest form is connected in two of the wires 16 and 17 and consists of a transformer apparatus, having primary windings 18 and 19 on different cores 20 and 21 and a tapped secondary winding 22 wound about both cores 20 and 21. The directions of the windings 18 and 19 are such that when currents are flowing in the same direction from transmitter to receiver in wires 16 and 17 the flux through secondary coil 22 is in the same direction and hence, winding 22 produces a voltage proportional to the vectorial sum of the current in windings 18 and 19. It will further be noted that the current flowing in winding 19 is shifted in phase by a phase shifting arrangement consisting, in this instance, of a resistance 23 in parallel with the high inductance winding 19.

In the arrangement shown, the current in winding 19 lags the current in wire 17 by 60 degrees, although the desired results would also be obtained if the current in winding 19 was advanced 60 degrees instead of being lagged. It is necessary to proportion the number of turns in coils 18 and 19 so that the same flux is produced in each core by the same line current. Hence, winding 19 has enough more turns than winding 18 to accomplish this. This arrangement thus produces a voltage, which may be led to a neon lamp signal 23, which is proportional to the sum of the currents in lines 16 and 17 when added in a 60 degree time phase-shift relation. I have found that this voltage is proportional to the current flowing between transmitter and receiver and hence, proportional to the angular displacement between the rotors of transmitter and receiver, and is independent of the average position of such rotors with respect to their stator windings. Thus, in the drawing, the voltage impressed on lamp 23 is proportional to the angle $a$ which exists between the two rotors 13 and if this same angle is maintained both rotors may be turned through 360 degrees without changing this signal voltage. If angle $a$ is increased, the voltage on the signal lamp is increased, and if angle $a$ is reduced to zero, the signal voltage will be reduced to zero.

When the system is functioning properly, lamp 23 does not light up. There will, of course, be small circulating currents in the transmission lines whenever angular motion is being transmitted, but under these conditions, the voltage across the lamp 23 is adjusted, by selecting the proper tap on coil 22, so that it does not light. However, if the rotor of the receiver is blocked and the angle between the two rotors exceeds an undesirable amount, for example 15 degrees, the lamp 23 will light and indicate the faulty condition of the system. Other faulty conditions which cause a large current to flow in the system will be indicated. For example, if the exciting coil 13 of the receiver 11 becomes opened such that the receiver loses its rotor excitation while excitation remains on the transmitter rotor, an appreciable current will flow in lines 15, 16, and 17 and lamp 23 will light up.

Sometimes transmitters and receivers are used in the same system when they are not exactly alike. In such a case small circulating currents will flow in the lines 15, 16 and 17 between them even though their rotors are in angular agreement and the system is otherwise in a normal condition. In such a case this will be taken into consideration and compensated for by using a lower voltage tap on transformer coil 22.

It will be noted that the core parts 20 and 21 are preferably separated sufficiently that flux produced in one core does not have a tendency to flow in the other core. Thus primary windings 18 and 19 are made sufficiently inductively independent of each other to prevent the current in line 16 modifying the current in line 17 and vice versa. However, both are inductively linked with the secondary winding 22. Other suitable arrangements for vectorially summing the currents in the two lines without interference might be used. The impedance of the transformer device is insufficient to cause any distortion or modification of the currents in the transmitting circuit.

The fact that the above described arrangement produces a signal voltage proportional to the error, if any, between transmitter and receiver independently of the average rotary position of the rotors may be shown mathematically.

The current in all three wires of the system is a function of the angle $a$ (designated $f(a)$) between the two rotors of transmitter and receiver but the currents in the different wires are not the same because these wires are connected to the stator winding at points which differ by space angles of 120 degrees, which space angle will be designated $x$ for convenience in the equations to be referred to. Let $\theta$ designate the space angle of the rotor of the transmitter from a given fixed point on the stator members. If the fixed point be properly chosen then the currents in any two wires may be designated as follows:

$$i1 = f(a) \sin\left(\theta + \frac{x}{2}\right)$$

$$i2 = f(a) \sin\left(\theta - \frac{x}{2}\right)$$

The currents may be converted, by suitable transformers, into voltages having the same relative magnitude. For a given angle $a$ $(fa)$ is a constant and hence the two voltages proportional to $i1$ and $i2$ may be given thus:

$$V1 = K \sin\left(\theta + \frac{x}{2}\right)$$

$$V2 = K \sin\left(\theta - \frac{x}{2}\right)$$

These are the voltages which are first shifted 60 degrees out of time phase and then added vectorially by the transformer apparatus described.

For convenience the 60 degree phase shift angle will be designated B.

The vector sum of V1 and V2 separated by the time angle B is $$V = K\sqrt{V1^2 + V2^2 + 2V1V2 \cos B}$$

$$\frac{V}{K} = \sqrt{\sin^2\left(\theta + \frac{x}{2}\right) + \sin^2\left(\theta - \frac{x}{2}\right) + 2 \cos B \sin\left(\theta + \frac{x}{2}\right) \sin\left(\theta - \frac{x}{2}\right)}$$

$$= \sqrt{\frac{1 - \cos(2\theta + x)}{2} + \frac{1 - \cos(2\theta - x)}{2} + \frac{2 \cos B(\cos x - \cos 2\theta)}{2}}$$

$$= \sqrt{1 - \cos 2\theta \cos x + \cos B(\cos x - \cos 2\theta)}$$

$$= \sqrt{1 + \cos x \cos B - \cos 2\theta(\cos x + \cos B)}$$

For this to be independent of $\theta$, $\cos B = -\cos x$. If this is satisfied, $$\frac{V}{K} = \sqrt{1 - \cos^2 x} = \sin x$$

$x = 120°$, $\cos B = -\cos 120 = -(-.5) = .5$ and hence $B = \pm 60°$.

It is thus proven that the resultant signal voltage V produced by the transformer is independent of $\theta$, or in other words is independent of the average rotary position of the rotor members of the transmitter and receiver from any particular point on the stators.

The voltage V does, however, vary with the current $i_1$ and $i_2$ and hence, with the angle $a$ between the two rotors.

Other combinations in which the relation $\cos B = -\cos x$ will also produce this result. $x$ in the above case is 120 degrees and hence, no change in this angle needs to be made because this space angle is inherent in the connections to the stator windings. The combination where $B=\pm 60$ degrees and $x=120$ degrees thus appears to be the simplest one that can be devised.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to obtain by Letters Patent of the United States is:

1. A system for the transmission of angular motion comprising receiver and transmitter devices, said devices each having relatively rotatable windings, means for energizing one winding of each device in parallel from a single phase source, a three-wire transmitting circuit connecting the other windings in a manner analogous to a three-phase connection, a transformer device having two primary windings said primary windings being inductively independent with respect to each other but inductively linked with the secondary winding and a secondary winding, connections for energizing said two primary windings by currents proportional respectively to the currents in two of the wires of said three-wire transmitting circuit, means for causing the current in one of said primary windings to be out of time phase with the current in the other primary winding by 60 degrees and a signal energized from the secondary winding of said transformer.

2. A system for the transmission of angular motion comprising an electrical transmitting device, an electrical receiving device responsive to movement of said transmitting device, a three-wire transmitting circuit analogous to a three-phase connection between said devices in which currents are set up upon angular disagreement between them, means for obtaining a current proportional to the current in one of said phases but shifted 60 degrees in time phase therefrom, and means for producing a voltage proportional to the vector sum of the last mentioned current and the current in another phase of said connection, said voltage being proportional to the angular disagreement between transmitter and receiver.

3. A system for the transmission of angular motion comprising an electric transmitting device and an electric receiving device, said devices having stationary and rotatable windings, a single phase source of supply for energizing one winding of each device in parallel, the other windings of said devices being connected together by a three-wire transmitting circuit in a manner analogous to a three-phase connection, a transformer device having two separated core portions, a primary winding on each of said core portions, connections for energizing said primary windings by currents proportional respectively to the current in two different wires of the transmitting circuit, a secondary winding surrounding sections of both of the separate core portions whereby a there is induced in said secondary winding a voltage proportional to the vector sum of the primary fluxes in the two core portions, and means for shifting the phase of the primary flux produced in one of said core portions with respect to that produced in the other core portion by such an angle that the voltage induced in said secondary winding is proportional to the angular displacement between the rotatable windings of the transmitting and receiving devices and independent of the average angular position of the rotatable windings with respect to the stationary windings thereof.

4. Angular motion transmission apparatus comprising transmitting and receiving devices each provided with stationary and rotatable windings one winding of the transmitter being connected to one winding of the receiver by a three-wire circuit analogous to a three-phase connection, a single phase source of supply for energizing the other windings of said devices in parallel, transformer means having two inductively independent primary windings energized respectively by currents in two of the wires of said three-wire circuit, said transformer means having a secondary winding into which is induced a voltage proportional to the vector sum of the currents in the primary windings, a phase shifting device associated with one primary transformer winding for producing a phase shift between the currents flowing in the two primary windings of such magnitude that the voltage induced in the secondary winding is proportional to the angular displacement between the rotary windings of transmitting and receiving devices, and is independent of the average position of the rotary windings with respect to the stationary windings of said devices, and electrically operated signaling means connected to the secondary winding of said transformer which signaling means is effectively energized only when the voltage of the secondary winding of said transformer exceeds a predetermined value.

FRITHIOF V. JOHNSON.